United States Patent [19]

Modjallal

[11] Patent Number: 4,568,182
[45] Date of Patent: Feb. 4, 1986

[54] OPTICAL SYSTEM FOR DETERMINING THE POSITION OF A CURSOR

[75] Inventor: Khosrow Modjallal, Killingworth, Conn.

[73] Assignee: Summagraphics Corporation, Fairfield, Conn.

[21] Appl. No.: 335,141

[22] Filed: Dec. 22, 1981

[51] Int. Cl.[4] .......... G01C 3/10; G01B 11/26; G02B 27/17
[52] U.S. Cl. .......... 356/1; 350/6.5; 350/6.9; 350/6.91; 350/100; 356/141; 356/152
[58] Field of Search .......... 356/1, 4, 28, 141, 152; 350/6.5, 6.9, 6.91, 100

[56] References Cited

U.S. PATENT DOCUMENTS

| | | | |
|---|---|---|---|
| 3,278,753 | 10/1966 | Pitts et al. | 356/5 |
| 3,603,691 | 9/1971 | Hamilton | 356/152 |
| 3,610,755 | 10/1971 | Wieberger et al. | 356/4 |
| 3,788,748 | 1/1974 | Knight et al. | 356/4 |
| 3,898,445 | 8/1975 | MacLeod et al. | 356/141 |
| 3,923,402 | 12/1975 | Turcotte | 356/152 |
| 4,143,400 | 3/1979 | Heckman et al. | 350/6.91 |

Primary Examiner—S. C. Buczinski
Attorney, Agent, or Firm—Yuter, Rosen & Dainow

[57] ABSTRACT

In an optical digitizer, a cursor is movable on a plane surface having coordinate axis. The cursor includes a source of light that is scanned across the coordinate system, and a detector receiving light from the angle to which the beam is instantaneously directed. The coordinate system has curved mirrors at the origin and point spaced from the origin along the axis thereof, and plane mirrors extending along the axis. A calculator determines the position of the cursor in the coordinate system by triangulation. Alternatively, the cursor may be a curved mirror, with rotating light sources and detectors positioned at determined points in the coordinate system.

18 Claims, 5 Drawing Figures

OPTICAL SYSTEM FOR DETERMINING THE POSITION OF A CURSOR

This invention relates to optical digitzers, and more in particular to a cursor and optical digitizing system wherein the position of a cursor in a coordinate system may be automatically digitized.

It is frequently desirable to determine the location digitally, in a two or three coordinate system. Various techniques have been employed in the past for this purpose, employing various position sensing devices, such as piezoelectric devices and magnetostrictive devices. While such arrangements have been in general satisfactory from the standpoint of the results that are achieved, they do have certain problems. For example, the boards or surfaces upon which the cursor is moved must be especially designed and relatively expensive, thereby increasing the cost and reducing the portability of the system.

The present invention is therefore directed to the provision of an improved digitizing system and cursor, wherein optical position sensing techniques are employed.

Briefly stated, in accordance with one embodiment of the invention, the movable cursor includes means for scanning a beam of light across the coordinate system, i.e., parallel to the surface upon which the cursor is to be moved. While the light may be visible light, it is of course apparent that light in other spectral ranges, such as infrared radiation as produced by a laser, falls within the meaning of the term "light" as employed herein. The cursor also includes a detector of light reflected back thereto from the angle at which the beam of light is instantaneously being directed. Simple reflectors are placed at determined points in the coordinate system, such that the detection of reflected light received by the cursor enables the determination, by triangulation, of the position of the cursor in the coordinate system.

In a particularly advantageous embodiment of the invention, the light is derived from a laser, and directed to the cursor by way of a flexible fiberoptic cable. This light is directed by way of a beam splitter to a rotating mirror that affects the scanning of the beam. Reflected light received at the rotating mirror is reflected, by way of the beam splitter, to a photo detector. In this arrangement, where a rectangular coordinate system is employed, curved mirrors are provided at the origin and spaced points on the coordinate axis, and plane mirrors extend along the coordinate axis.

In a further embodiment of the invention, the cursor may be a simple curved reflecting surface, with rotating scanning beam and detecting devices being employed at various points in the coordinate system.

In order that the invention will be more clearly understood, it will now be disclosed in greater detail with reference to the accompanying drawings, wherein.

Figure 1:
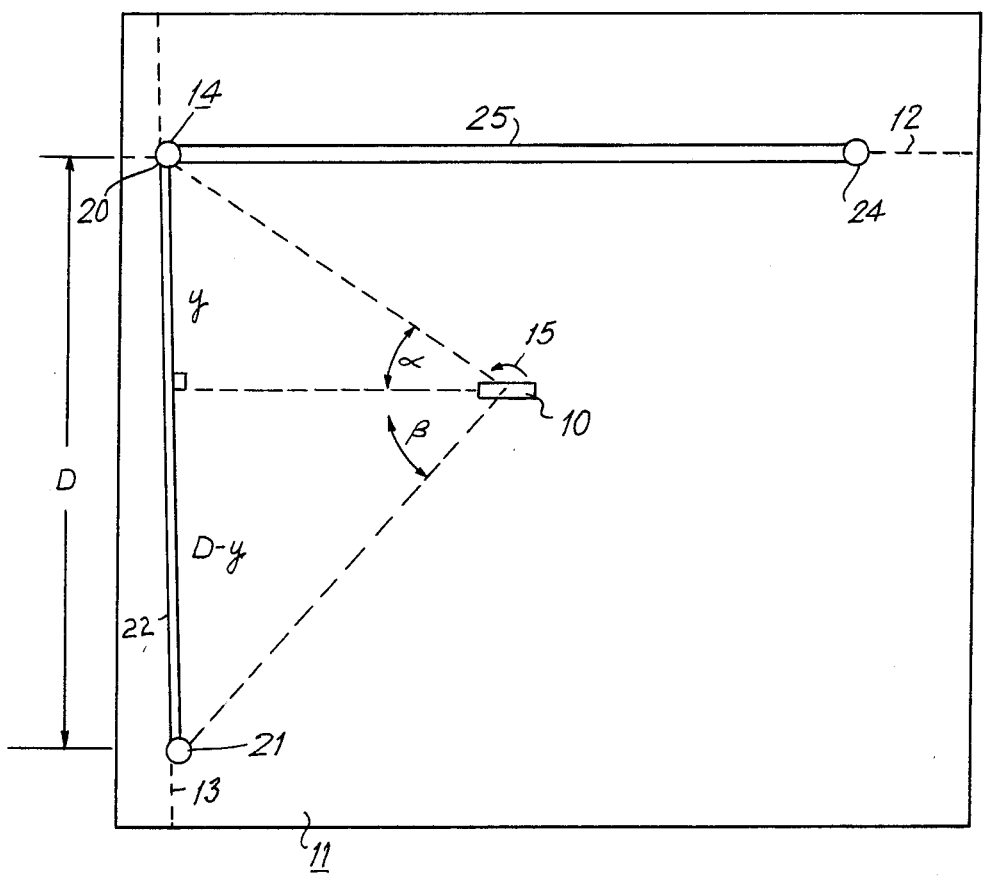
FIG. 1 is a simplified plan view of an optical digitizing system in accordance with the invention, illustrating the principal of operation thereof.

Referring now to the drawings, and more in particular to FIG. 1, a cursor 10 is freely movable in a plane, for example, on a board 11. In the preferred embodiment of the invention a pair of orthogonal axes is defined on the board, such as the x axis 12 or abscissa, and the y axis 13 or ordinate, intersecting at the origin 14.

The cursor 10, as will be disclosed in greater detail in the following paragraphs, includes a source of light and a detector, these elements being continually rotated at a given rate, for example in the direction shown by the arrow 15 in FIG. 1. A curved reflector 20 is mounted at the origin 14, such that light falling thereon from the cursor at any point on the board, will be directly reflected back to the light detector in the cursor. A curved reflector 21 is mounted on the y axis at a point spaced from the origin, this reflector also being mounted to reflect light received from the cursor directly back to be detected by a light detector in the cursor.

A plane reflector 22 is provided extending along the y axis between the curved reflectors 20 and 21. This plane reflector 22 thus is arranged so that whenever the light from the cursor follows a path perpendicular to the plane of the reflector 22, this light will be reflected immediately back to the cursor for detection.

In a similar matter, a further curved reflector 24 is provided on the x axis, spaced from the origin, and a further plane reflector 25 is provided extending from the origin along the x axis to the reflector 24.

A geometrical analysis of the structure illustrated in FIG. 1 shows that:

$$y = \frac{D \tan \alpha}{\tan \alpha + \tan \beta} \tag{1}$$

wherein y is the spacing of the cursor from the x axis, D is the length on the y axis between the origin and the curved reflector 21, $\alpha$ is the angle between the lines from the cursor to the origin and the line from the cursor perpendicular to the y axis, and $\beta$ is the angle between the line extending from the cursor to the reflector 21 on the y axis and the perpendicular from the cursor to the y axis. In this relationship, since the distance D can be predetermined, it is evident that the distance y can be ascertained from a knowledge of the angles $\alpha$ and $\beta$. If, now, the light source and detector in the cursor are rotating at a constant known rate, it is further evident that the time between detection of pulses by the detector from the curved reflector 20, plane reflector 22 and curved reflector 21, enable a determination of the angles $\alpha$ and $\beta$, and hence the calculation of the distance y from the cursor to the x axis.

Figure 2:
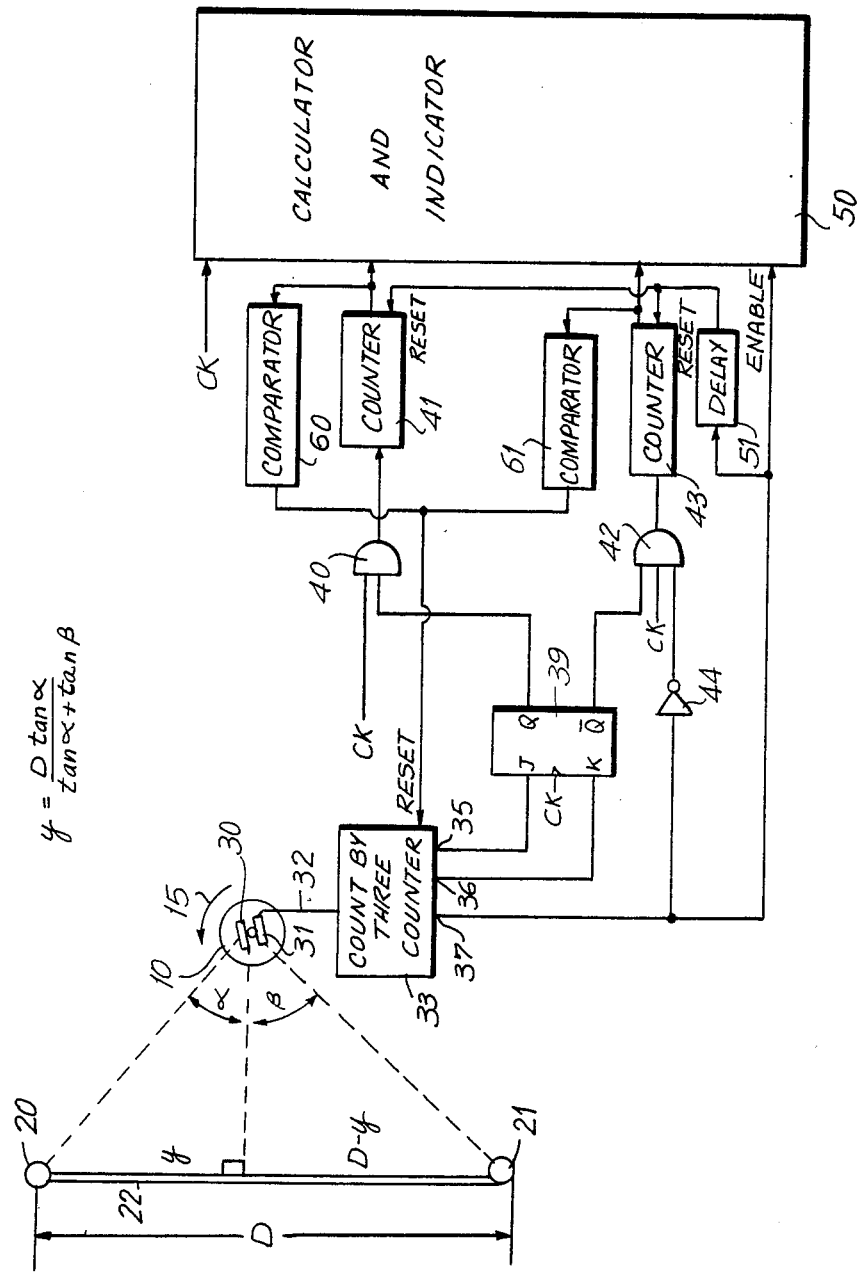
FIG. 2 is a simplified block diagram of one embodiment of the optical digitizing system of the invention.

FIG. 2 illustrates, in a simple manner one technique that may be employed for determining the angles $\alpha$ and $\beta$ and hence for calculating the distance y. In this figure, the cursor 10 is illustrated as having a light source 30, and a light detector 31, rotatable therewith. The detector 31 is coupled by conventional means, such as a lead 32, to a counter 33. It will be evident, from the above discussion, that, upon rotation of the cursor, a light pulse will be reflected back to and detected by the detector at each time the source is directed to the curved reflector 20, and the curved reflector 21, and also at each time the light beam is directed normal to the plane mirror 22.

In the above example, the counter 33 is a count by 3 counter, having outputs 35, 36, and 37 adapted to be energized sequentially upon receipt by the counter of a detected pulse. The term "energized" may refer, for example only, to a high logic state. As illustrated in FIG. 2, the output 35 is connected to the J input of a JK flip flop 39, and the output 36 is connected to the K input of the flip flop 39. The Q input of the flip flop is connected to gate clock pulses, in an AND gate 40, to a first counter 41. The Q output of the flip flop 39 is connected to gate clock pulses, by means of AND gate 42, to a second counter 43. The clock pulses are also applied, in conventional manner, to the flip flop 39. The output 37 of the counter 33 is connected, by way of inverter 44, to a third input of the gate 42.

Before proceeding with the discussion of the remainder of the circuit, its operation will be described. Assume, for example, that a pulse is detected by the detector 31, resulting from reflection from the origin 20, and that the counter has been set such that this pulse energizes the output 35. As a consequence, gate 40 will be enabled to pass clock pulses to the counter 41. The counter 41 will continue to count until the next pulse is received from the detector 31, i.e., when the light source is directed perpendicular to the plane mirror 22. At this time the output 35 will be de-energized, to stop counting in the counter 41, and the output 35 will control the flip flop 39 to enable the AND gate 42. As a consequence, clock pulses will now be counted in the counter 43. This will continue until the next pulse is received by the counter 33, at which time the output 37 will be enabled, and thereby, by way of inverter 44, to block the gate 42. Hence at this time, the counter 41 contains a count proportional to the angle $\alpha$ and the counter 43 contains a count proportional to the angle $\beta$. These outputs may be applied to the calculator and indicator 50 of any desired design. The pulses may, for example, be clocked into the calculator as they occur. The output 37, which occurs when the two counters correspond to the respective angles, may thus be employed to enable the calculator to calculate the angles, and hence the distance y, in accordance with the above formula. In addition, the output 37 may be applied, by way of a delay circuit 51, to reset the counters 41 and 43.

For the above operation it must be of course insured that the energization of the output 35 occurs in response to detection of a light pulse reflected from the origin 20. For this purpose, the counts of counters 41 and 43 are compared, in comparator 60 and 61, with counts corresponding to large angles, for example, 90° or more, since neither of the angles $\alpha$ or $\beta$ can be this large. Accordingly, when a count in one of these counters corresponds to such a large angle, this signifies that the count really corresponded to the outside angle, and hence the comparator in which such a comprison is found effects the resetting of the count by three counter 33. The next detected pulse will hence correctly be the pulse received from the origin, and will effect energization of the correct output 35.

Figure 3:
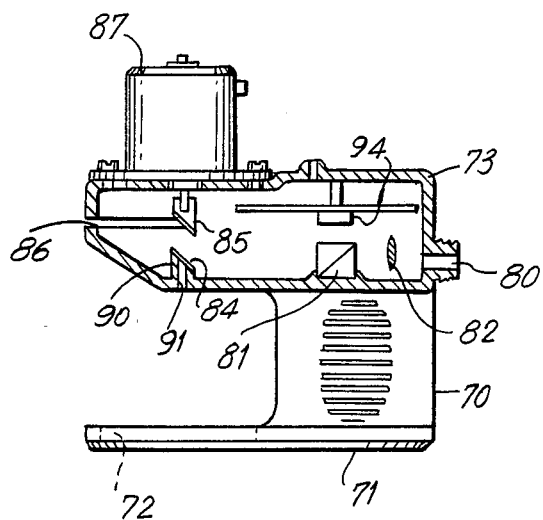
FIG. 3 is a partially cross-sectional side view of one embodiment of a cursor that may be employed in the invention.
Figure 4:
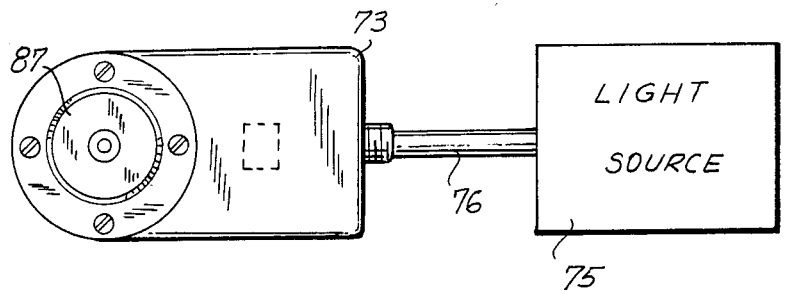
FIG. 4 is a top view of the cursor of FIG. 3, shown connected to an external light source.

One embodiment of a cursor that may be employed in the invention is illustrated in FIGS. 3 and 4. The cursor has a base 70 with a lower flat surface 71 adapted to engage the board. A circular aperture 72 is provided extending through the base, to permit alignment of the cursor with a desired position on the board. The optical elements of the cursor are provided within a cover housing 73 separately mounted upon the base.

In the illustrated embodiment of the invention, an external light source is provided, for example, the light source indicated by the block 75 in FIG. 4, and connected to the cover housing 73 by way of a flexible fiberoptic cable 76.

As illustrated in FIG. 3, light from the figeroptic cable is directed into entrance port 80 in a direction parallel to bottom surface 71. This light is directed to a beam splitter 81, for example by way of a focusing lens 82. Light passing the beam splitter 81 in this direction is directed to a stationary mirror 84 at an angle of 45°, this mirror reflecting the beam outwardly in the cursor to a rotating mirror 85. The rotating mirror 85 is at an angle of 45° to the beam at this point, and hence deflects the beam again into a plane parallel to the base plane 71. The cover housing 73 has a horizontal slit 86 extending through an angle, for example, about 180° with respect to the axes of the rotating mirror 85, so that the rotating mirror scans the beam through this opening. The mirror 85 is rotated by a constant speed motor 87 mounted, for example, in the top of the cover housing 73. This motor may be energized by a suitable power source in the base 70, for example, or it may be connected by flexible leads to an external source.

In order to enable precisely positioning the cursor at any desired point on the board, the mounting projection 90 for the mirror 84 may be provided with a downwardly extending aperture 91 centrally aligned with the hole 72 in the base, the mirror 84 being less than fully silvered so that light reflected thereto from the mirror 85 will be precisely directed at the central location of the aperture 72 on the board.

When the light reflected from mirror 85 falls upon one of the curved mirrors 20, 21, or 24, or when it is directed to one of the plane mirros 22 or 25 at an angle perpendicular to the respective mirror, light will be reflected back to the cursor, falling upon the rotating mirror 85. This light is then directed to the angled mirror 84, and back to the beam splitter 81. At the beam splitter the reflected light is directed to a detector, such as photo transistor 94 mounted directly above the beam splitter in the cover housing. The photo transistor may be coupled to the external calculating device, for example of the type illustrated in FIG. 2, by conventional means such as wire leads or the like.

In operation, the cursor is placed upon the board 11, and moved to a desired position. Assuming that only the y dimension is to be determined, such as illustrated in FIG. 1, the slit in the cursor is oriented in order to enable scanning of the beam continuously from the curved mirror 20 at the x axis to the curved mirror 21 at the extremity of the y axis. The resultant pulses of light detected at the cursor are received at times dependent upon the physical location of the cursor with respect to the x and y axes, so that the distance y to the x axis may be calculated in accordance with the above relationship. This calculation may of course be effected electronically, with a digital or other desired type of read-out. As discussed above, the distance between the mirrors 20 and 21 is known, as is the constant speed of rotation of the rotating mirror in the cursor.

It will of course be apparent that a similar technique may be employed for determining the distance x from the cursor to the y axis. The x distance may be determined separately from the y distance, in a manner similar to that shown in FIG. 1, or, alternately, the calculator may be modified to also count the relative timing of detection of pulses from the mirror 24 and 25. In this instance the slit in the cursor may have a greater angle, in order to enable full scanning of the curved and plane mirrors.

The optical digitizer of the invention, as disclosed above, thereby enables the rapid and accurate digitization of a position on a board or tablet. The board or tablet need not be stationary, and, in view of the use of optical measuring techniques, the device is not subject to electromagnetic interference. The measured distances may be relatively long, for example greater than several feet, since the light source may be a laser having significant beam intensity. The digitizing speeds, accuracy and resolution of the digitizer may be directly controlled by the operator. The circuit requires only a minimum of electronic circuitry, and is hence economical for both domestic and commercial applications. The arrangement is also readily adaptable to portable use, since, for example, the mirrors mounted on the board may be adapted to be folded so that they do not project from the surface of the board, for transportation. The curved mirrors mounted on the board may be comprised simply of silvered rods.

Figure 5:
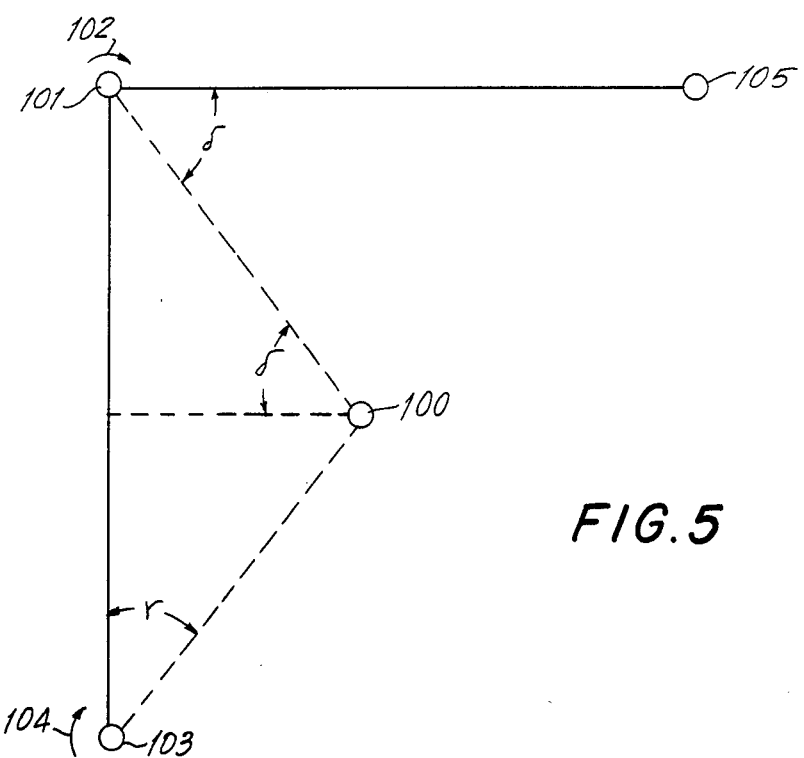
FIG. 5 is a simplified schematic illustration of a further embodiment of the invention.

In a somewhat similar manner, the optical digitizer in accordance with the invention may employ a purely passive cursor, for example, a curved mirror or reflective rod 100, as illustrated in FIG. 5. In this arrangement, a rotating light source 101 is provided at the origin, rotating as indicated by the arrow 102. The source 101 also includes a detector, and may be fabricated much in the manner of the cursor structure illustrated in FIG. 3. A similar combined rotating light source and light detector 103, rotating in the direction of arrow 104, is provided at the extremity of the ordinate. Since the rotating assembly 101 is stationary on the board, it may have a reference position corresponding to the x axis built in, for example such that a pulse in emitted by the device at each crossing of the abscissa. Alternatively of course a curved mirror 105 may be provided at the extremity of the x axis, such that a count may be derived, for example employing a circuit similar to that of FIG. 2, that is proportional to the angle $\delta$ between the x axis and the line extending between the origin and the cursor, it being noted that the cursor reflects the light directly back to the origin. The angle $\delta$ is of course the same as the angle $\alpha$ in the arrangement of FIG. 1.

The rotating assembly 103 of FIG. 5, being stationary, may of course be referenced to the y axis, so that the angle $\gamma$ between the y axis and the line extending between the assembly 103 and the cursor may be readily determined. In this arrangement the angle $\gamma$ is of course the complement of the angle $\beta$, in the arrangement of FIG. 1. Instead of depending upon the absolute orientation of the light from device 103, this orientation may be determined for example by suitable reflecting means provided on the y axis. It is of course apparent that the reflectors for determining orientation with respect to the x and y axis may be placed at any other convenient position. It is similarly apparent that the arrangement illustrated in FIG. 5 for determination of the distance y may be similarly employed for determination of the distance of the cursor from the y axis.

While the invention has been disclosed and described with reference to a limited number of embodiments, it will be apparent that variations and modifications may be made therein, and it is therefore intended in the following claims to cover each such variation and modification as falls within the true spirit and scope of the invention.

What is claimed is:

1. An optical position determining system comprising a pair of a plurality of elements positioned at defined positions of a coordinate system, and of which elements there is defined a cursor element movable with respect to said positions, one of said elements comprising means for continually rotatably scanning a beam of electromagnetic energy across said system at a determined angular velocity so as to periodically direct said beam toward the other of said elements, said one element further comprising means for receiving and detecting electromagnetic energy reflected toward said one element instantaneously received from the angle toward which the beam is directed, the other of said elements comprising curved reflector means and shaped to receive said beam and reflect it directly back to said one element from any position in said system, said optical system further comprising means for determining a reference position of the beam, means responsive to the time for movement of said beam between said reference position and a position at which reflected energy is received at said one element for determining the relative angular position of said other of said elements with respect to said reference position, and means coupled to said one element for calculating the relative position of said cursor in said coordinate system by triangulation.

2. The optical position determining system of claim 1 wherein said one element is comprised of said cursor, said coordinate system being a rectangular coordinate system with said other of said elements positioned at the origin of said rectangular coordinate system, and further comprising separate additional curved reflecting elements positioned from the origin on the x and y axes of said coordinate system, and plane reflecting means extending along said axis from said origin to said other curved reflecting means.

3. The optical position determining system of claim 2 wherein said cursor comprises a source of light, a mirror in a plane at a 45° angle to the plane of said system, means for rotating said mirror about an axis normal to the plane of said system, and means directing said beam of light to said mirror, whereby the beam of light is scanned at a constant angular velocity across said coordinate system.

4. The optical position determining system of claim 3 wherein said source of light comprises a laser coupled by a flexible fiberoptic cable to said cursor, said cursor further comprising a second mirror in a plane at a 45° angle to the plane of said coordinate system and being aligned with the rotational axis of said first mentioned mirror, and means directing light from said fiberoptic cable to said second mirror.

5. The optical position determining system of claim 4 wherein said means directing light from said fiberoptic cable to said second mirror comprises a beam splitter, said cursor further comprising a photo detector positioned to receive light from said beam splitter that has been reflected back to said rotating mirror, second mirror and beam splitter in that order, whereby said photo detector receives light directed to the cursor at the angle to which the beam is instantaneously being directed.

6. The optical position determining system of claim 1 wherein said coordinate system is a rectangular coordinate system, said one element being positioned at the origin of said coordinate system, said other other of said elements comprising a reflective rod defining said cursor.

7. The optical position determining system of claim 6 wherein a second one of said elements comprises means for rotatably scanning a beam of electromagnetic energy parallel to said system at a determined angular velocity so as to periodically direct a beam toward said other elements, said one and said second one of said rotatably scanning elements further comprising means for receiving and detecting the electromagnetic energy reflected thereto from at least one reflective other of said elements, other than said another of said elements, to provide an internal reference position signal at the angle to which the respective beam is directed, said second one of said elements being positioned along one of the axes of said coordinate system spaced from said origin, and being coupled to said calculating means.

8. In a position determining system having a cursor movable on a plane surface having a reference axis extending from an origin, the improvement comprising curved reflective elements at said origin and another point on said axis, and a plane reflector extending along said axis, said reflective elements and reflector being positioned to receive radiation from said cursor and reflect it back to said cursor when said cursor is located on said surface, said cursor comprising means for rotationally scanning radiation at a constant angular rate in a plane parallel to said plane surface, to periodically be reflected from said reflective elements and reflectors to said cursor, and means receiving radiation reflected from said reflective elements and plane reflector.

9. The position determining system of claim 8 further comprising arithmetic means responsive to the receipt of radiation at said cursor for determining the relative location of said cursor on said plane surface by triangulation.

10. The position determining system of claim 8 wherein said cursor comprises a source of light, first and second spaced mirrors having mirror surfaces in planes with each of said planes being at an angle of 45° to the plane of said plane surface, said first and second mirrors being spaced to face one another along an axis normal to said plane surface, means for rotating one of said spaced mirrors about said axis thereof at a constant angular velocity, and means directing said light to the other of said spaced mirrors.

11. The position determining system of claim 10 wherein said source of light comprises a laser coupled to said cursor by a flexible fiberoptic cable, and beam splitter means directing light from said cables to the other of said spaced mirrors, and further comprising photo detector means positioned to receive light from said beam splitter means that has been reflected thereto by way of said first and second spaced mirrors.

12. A cursor for an optical position determining system, comprising a housing having a flat bottom for movement on a plane surface, said flat bottom having a hole, said housing having first and second mirrors having mirror surfaces in planes with the planes of each of said mirror surfaces being at a 45° angle to the plane of said flat bottom, said mirrors being spaced from one another along an axis normal to the plane of said flat bottom, means for rotating one of said mirrors about said normal axis at a constant angular rate with respect to the other of said mirrors, means directing light to the other of said mirrors whereby the light is reflected from the other of said mirrors to the rotating mirror to be scanned in a plane parallel to said flat bottom, the other of said mirrors having an aperture centrally aligned with said hole in said flat bottom to direct a beam of light from said one mirror to the center of said hole, said other of said mirrors being closer to said flat bottom than said one mirror, said housing having a slit through which the scanned light may pass, said means for directing light to the other of said mirrors comprising a beam splitter, said cursor further comprising photo detector means positioned to receive light from said beam splitter that has been reflected thereto by way of said one and other mirror and beam splitter in that order.

13. A position determining system comprising a first pair of a plurality of elements positioned at a defined position of a coordinate system, of which elements there is defined a cursor element movable with respect to said position, one of said cursor or a first of said pair of elements comprising means for rotatably scanning a beam of energy across said system at a determined angular velocity so as to periodically direct said beam toward the other of said elements, said one element further comprising means for receiving and detecting energy reflected toward said one element instantaneously received from the angle toward which the beam is directed, the other of said elements comprising curved reflector means shaped to receive said beam and reflect it directly back to said one element from any position in said system, said position determining system further comprising means determining a reference position at the beam, means responsive to the time for movement of said beam between the reference position and a position at which reflected energy is received at said one element for determining the relative angular position of said other elements with respect to said reference position and means coupled to said one element for calculating the relative position of said cursor in said coordinate system by triangulation.

14. The position determining system of claim 13 wherein said one element is comprised of said cursor, said coordinate system being a rectangular coordinate system with another of said elements positioned at the origin of said rectangular coordinate system and further comprising separate additional curved reflecting elements positioned spaced from the origin on the x and y axes of said coordinate system.

15. In a position determining system having a cursor movable on a plane surface having a reference axis extending from an origin, the improvement comprising curved reflective elements at said origin and another point on said axis, and a plane reflector extending along said axis, said reflector and curved element being positioned to receive energy from and reflect it back to all locations on said surface, said cursor comprising means for rotationally scanning a beam of said energy at a constant angular rate in a plane parallel to said plane surface, to periodically be reflected from said reflector, and means receiving energy of said beam reflected from said reflective elements and plane reflectors.

16. The position determining system of claim 15 further comprising arithmetic means responsive to the receipt of energy at said cursor for determining the relative location of said cursor on said plane surface by triangulation.

17. An optical position determining system comprising a movable element having a source of a beam of electromagnetic radiation, a radiation receiver, and means rotating said beam at a predetermined angular rate, a fixed curved radiation reflector positioned to receive said beam and reflect it back to said element when said element is in a given area, a fixed plane radiation reflector positioned to receive said beam and reflect it back to said element when said element is within said area, and means coupled to said receiver for determining the relative times of receipt of reflected radiation from said curved and the plane reflectors for determining the position of said element in said area.

18. The optical position determining system of claim 17 wherein said area is a rectangular coordinate system, said curved reflector being at the origin of said system and said plane reflector extending along one axis of said system, and further comprising a second curved reflector positioned at a point on said axis spaced from said origin, said means for determining the relative times of receipt of reflected radiation further comprising means for determining the relative time of receipt of radiation reflected from said second curve mirror.

* * * * *

UNITED STATES PATENT AND TRADEMARK OFFICE
CERTIFICATE OF CORRECTION

PATENT NO. : 4,568,182
DATED : February 4, 1986
INVENTOR(S) : KHOSROW MODJALLAL

It is certified that error appears in the above-identified patent and that said Letters Patent is hereby corrected as shown below:

Column 4, line 6, change "figeroptic" to --fiberoptic--.

Column 4, line 35, change "mirros" to --mirrors--.

Column 6, line 68, omit "other" second occurrence.

Column 8, line 57, change "reflectors" to --reflector--.

Signed and Sealed this

Fourth Day of November, 1986

[SEAL]

*Attest:*

DONALD J. QUIGG

*Attesting Officer*  *Commissioner of Patents and Trademarks*